US008020035B2

(12) United States Patent
Voigt et al.

(10) Patent No.: US 8,020,035 B2
(45) Date of Patent: Sep. 13, 2011

(54) EXPANDER CIRCUIT FOR A SOLID STATE PERSISTENT STORAGE DEVICE THAT PROVIDES A PLURALITY OF INTERFACES TO CORRESPONDING STORAGE CONTROLLERS

(75) Inventors: Douglas L. Voigt, Boise, ID (US); David William Thiel, Colorado Springs, CO (US); David Alan Daigle, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 301 days.

(21) Appl. No.: 12/242,022

(22) Filed: Sep. 30, 2008

(65) Prior Publication Data
US 2010/0083040 A1    Apr. 1, 2010

Related U.S. Application Data

(60) Provisional application No. 61/084,650, filed on Jul. 30, 2008.

(51) Int. Cl.
G06F 11/00 (2006.01)
(52) U.S. Cl. ............... 714/5.1; 714/43; 710/62; 710/74; 710/313

(58) Field of Classification Search ................. 714/4, 6, 714/43, 4.1, 5.1; 710/62, 72, 74, 313, 305
See application file for complete search history.

(56) References Cited

U.S. PATENT DOCUMENTS

| | | | |
|---|---|---|---|
| 6,715,019 B1* | 3/2004 | Benson et al. ................ 710/305 |
| 7,434,107 B2* | 10/2008 | Marks .............................. 714/43 |
| 7,519,854 B2* | 4/2009 | Lucas et al. ......................... 714/9 |
| 7,539,799 B2* | 5/2009 | Ashmore et al. ............... 710/74 |
| 7,574,630 B1* | 8/2009 | Ranaweera et al. ............. 714/43 |
| 2005/0066100 A1* | 3/2005 | Elliott et al. ................... 710/300 |
| 2005/0086413 A1* | 4/2005 | Lee et al. ....................... 710/313 |
| 2009/0274162 A1* | 11/2009 | Gopal Gowda et al. ...... 370/419 |
| 2009/0292861 A1* | 11/2009 | Kanevsky et al. ............ 711/103 |

OTHER PUBLICATIONS

Wikipedia, "VMEbus," http://en.wikipedia.org/wiki/VMEbus, pp. 1-6 (at least as early as Jul. 10, 2008).
Wikipedia, "HyperTransport," http://en.wikipedia.org/wiki/HyperTransport, pp. 1-4 (at least as early as Jul. 10, 2008).
Wikipedia, "erasure Code," http://en.wikipedia.org/wiki/Erasure_code, pp. 1-3 (at least as early as Jul. 10, 2008).

* cited by examiner

Primary Examiner — Yolanda L Wilson

(57) ABSTRACT

A system includes a solid state persistent storage device, and a plurality of storage controllers to manage access of the solid state persistent storage device. An expander circuit is connected to the solid state persistent storage device and has a plurality of computer-based bus interfaces connected to the corresponding plurality of storage controllers.

11 Claims, 4 Drawing Sheets

EXPANDER CIRCUIT FOR A SOLID STATE PERSISTENT STORAGE DEVICE THAT PROVIDES A PLURALITY OF INTERFACES TO CORRESPONDING STORAGE CONTROLLERS

CROSS REFERENCE TO RELATED APPLICATIONS

This Application claims the benefit of U.S. Provisional Application Ser. No. 61/084,650, filed Jul. 30, 2008, titled "Expander Circuit For A Solid State Persistent Storage Device That Provides A Plurality Of Interfaces To Corresponding Storage Controllers" which is hereby incorporated by reference herein as if reproduced in full below.

BACKGROUND

It is common for enterprises (e.g., companies, educational organizations, government agencies, etc.) to store data of the enterprises on centralized storage systems. Such storage systems typically include fault-tolerant mechanisms that allow retrieval of data even if certain components of the storage systems fail.

Many storage systems use disk arrays, which are arrays of disk-based storage devices. For improved fault tolerance, some disk arrays use dual-port disk-based storage devices coupled to redundant networks and redundant controllers. In such an arrangement, failure of a network or a controller will not cause loss of data since another network or another controller can be used to access data in a dual-port disk device.

An issue associated with using disk-based storage devices is that access speeds of a disk-based storage device are relatively poor. However, fault-tolerant technology for higher access speed storage devices, such as solid-state storage devices, is not as mature as those provided for disk-based storage devices. As a result, storage systems that are based oh solid state, storage devices do not provide the enhanced level of data protection that may be present in disk-based storage systems.

BRIEF DESCRIPTION OF THE DRAWINGS

Some embodiments of the invention are described with respect to the following figures.

DETAILED DESCRIPTION

Figure 1:
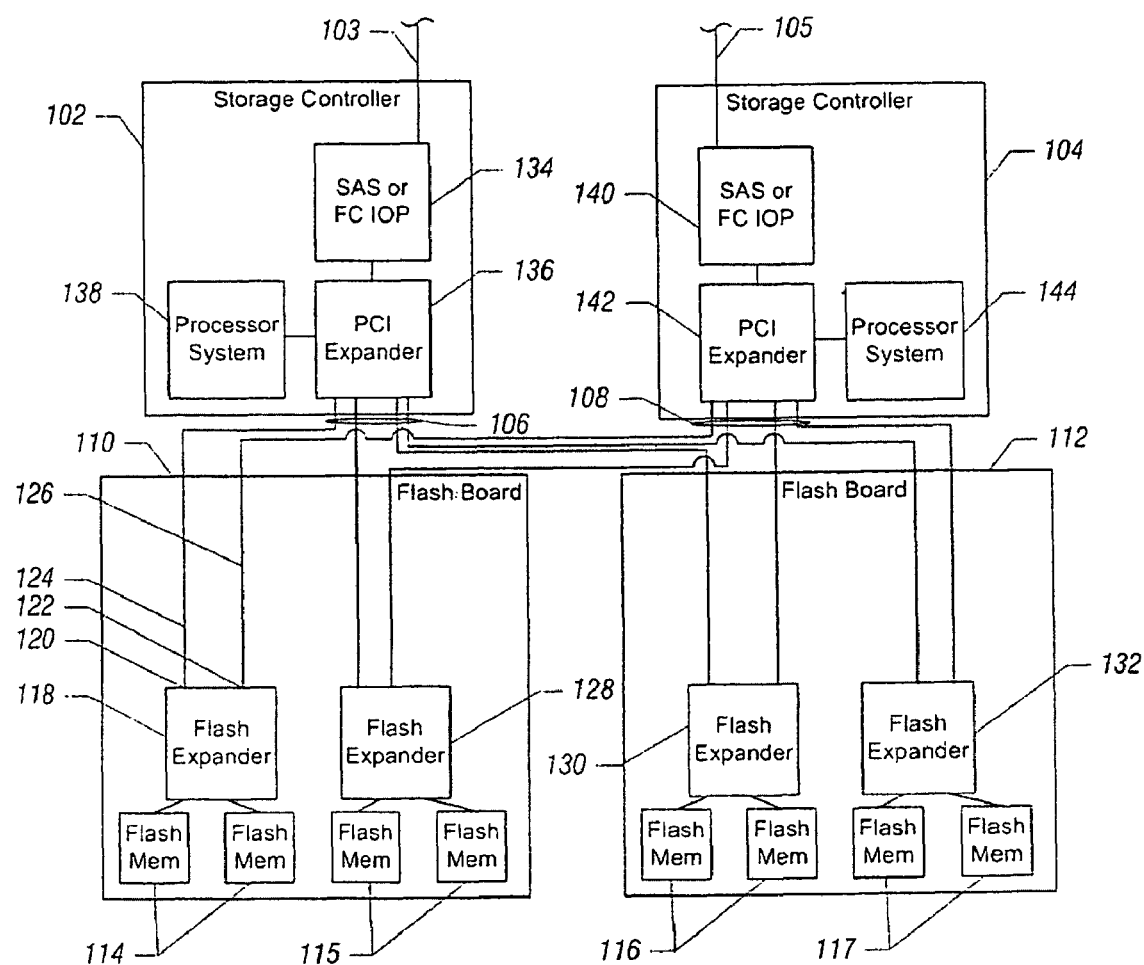
FIGS. 1-2 are block diagrams of storage systems that include solid state persistent storage devices and expander circuits for providing fault tolerance, in accordance with some embodiments.

In accordance with some embodiments, a storage system is implemented with multi-ported (e.g., dual ported) solid state persistent storage devices to provide improved fault tolerance. Each multi-ported solid state persistent storage device is able to connect (through one or more expander circuits) to storage controllers (and associated storage networks) such that failure of any one storage controller or storage network does not cause data in the multi-ported solid state persistent storage device to become irretrievable.

An "expander circuit" refers to a circuit that is able to connect one device (e.g., solid state persistent storage device) to at least two other devices (e.g., storage controllers). An expander circuit (or more simply, an "expander") can refer to one component or to a combination of components.

A "solid state persistent storage-device" is a storage device that is able to maintain data stored in the storage device even though power in the system in which the storage device is located has been lost. In one example, a solid state persistent storage device can be a flash memory device, such as a NAND flash memory device. In another example, the solid state persistent storage device can be an electrically erasable and programmable read-only memory (EEPROM). Other examples of solid state persistent storage devices include: (1) magnetic random access memories; (2) nanotechnology storage devices; (3) battery-backed memory devices (such as dynamic random access memories (DRAMs) that are connected to a battery to enable data in the DRAMs to be maintained even though system power is lost); and other storage devices. A solid state persistent storage device is different from a disk-based storage device, such as a magnetic disk-based storage device or optical disk-based storage device.

A "multi-ported" solid state persistent storage device refers to a solid state persistent storage device that is associated with an expander circuit that has multiple interfaces (also referred to as ports) for connection to corresponding storage controllers (and associated storage networks). The multiple interfaces of the multi-ported solid state persistent storage device in some embodiments are provided by an external expander circuit; note that in such embodiments the solid state persistent storage device itself does not have to be modified from standard designs. In other embodiments, expander circuits can be incorporated into solid state persistent storage devices, such that the expander circuits are part of the solid state persistent storage devices and multiple interfaces are provided on the solid state persistent storage devices.

In some embodiments, the interfaces provided by an expander circuit are computer-based bus interfaces, such as a Peripheral Component Interconnect (PCI) bus interface. Note that a "bus" can be a point-to-point bus or a multipoint bus. Various versions of the PCI bus interface exist, such as PCI Express, conventional PCI, and PCI-X. It is noted that reference to PCI or Peripheral Component Interconnect is intended to refer to any one of the above PCI standards or any other PCI standards, whether currently existing or to be later developed. In other implementations, other computer-based bus interfaces can be used, such as the HyperTransport bus interface or VME bus interface.

More generally, a "computer-based bus interface" refers to any interface for communicating signaling and data within a computer, rather than between computers. The computer-based bus interface provides intra-computer communications between components of a computer, rather than inter-computer communications between different computers. A computer-based bus interface is distinguished from storage-based communications interfaces, such as Fibre Channel interfaces, as defined by the Fibre Channel Industry Association. In other implementations, other types of computer-based interfaces, aside PCI, can be used.

FIG. 1 is a block diagram of an exemplary portion of a storage system that includes storage controllers 102 and 104 that are interconnected by respective sets 106 and 108 of communications links to storage boards 110 and 112. In this context, the storage system is considered the "computer" in which expander circuits with computer-based bus interfaces are provided, as explained below. A "storage board" refers to a circuit board or other support structure on which are mounted solid state persistent storage devices, in this case flash memory devices (114 and 115 on storage board 110, and 116 and 117 on storage board 112). The storage boards 110 and 112 are also referred to as flash boards since they contain flash memory devices. In other examples, other types of solid state persistent storage devices can be employed.

In the ensuing discussion, reference is made to flash memory devices; it is contemplated that the same techniques or mechanisms can be applied to other types of solid state persistent storage devices.

The flash memory devices 114 are connected to one side of a flash expander circuit 118 on the flash board 110. The other side of the flash expander circuit 118 has multiple interfaces 120 and 122 that are connected by corresponding communication links 124 and 126 to storage controller 102 and storage controller 104, respectively. In other words, the first interface 120 of the flash expander circuit 118 is connected over the link 124 to the storage controller 102, while the second interface 122 of the flash expander circuit 118 is connected over link 126 to the storage controller 104. In this manner, each of the flash memory devices 114 is considered to be a multi-ported flash memory device, since each flash memory device is capable of being accessed by either the storage controller 102 or storage controller 104 through the flash expander circuit 118 and the links 124 and 126.

In some embodiments, the interfaces 120 and 122 of the flash expander circuit 118 are PCI interfaces. Thus, the links 124 and 126 connected to the interfaces 120 and 122, respectively, are PCI buses connected to the respective storage controllers 102 and 104. In alternative embodiments, the interfaces 120 and 122 can be implemented with other types of computer-based bus interfaces, and thus the links 124 and 126 can be implemented with other types of computer buses.

Similarly, each of the other flash expander circuits 128, 130, and 132 is connected on one side to flash memory devices (115, 116, or 117, respectively) and on the other side over links to corresponding storage controllers 102, 104. Each of the flash expander circuits 128, 130, and 132 includes two PCI bus interfaces that are connected over corresponding PCI buses to the storage controllers 102, 104, similar to the connection of the flash expander circuit 118. Alternatively, instead of PCI bus interfaces, the expander circuits of FIG. 1 can include other types of computer-based bus interfaces to enable communication between components of the storage system.

In this manner, each of the flash memory devices 114, 115, 116, 117 is provided with dual ports such that a failure of a storage controller 102, 104 or a storage network 103, 105 or a link in the link sets 106, 108 connected to the respective storage controller 102, 104 does not cause the respective flash memory device to become inaccessible.

The storage controller 102 includes an input/output processor (IOP) 134 that is connected to the storage network 103. The IOP 134 can be an SAS (Serial-Attached SCSI) or Fibre Channel IOP for connection to a corresponding SAS network or Fibre Channel network 103. In an alternative implementation, the IOP 134 is omitted, and the storage controller 102 can be connected to a computer bus, such as a PCI bus, for example. Remote client devices are able to submit requests (e.g., read and write requests) to the storage controller 102 over the storage network 103.

The storage controller 102 also includes a PCI expander 136 that is connected on one side to the IOP 134 and on another side to the set 106 of links to allow the storage controller 102 to be connected over PCI buses to the flash boards 110 and 112. The storage controller 102 also includes a processor system 138 that is connected to the PCI expander 136. The processor system 138 is used for managing access (read or write) of the flash memory devices on the flash boards 110 and 112. A PCI expander connects one device (e.g., IOP 134 or processor system 138) to at least two other devices (e.g., flash boards 110 and 112) over respective PCI buses.

The other storage controller 104 similarly includes an SAS or Fibre Channel IOP 140, a PCI expander 142, and a processor system 144. In an alternative implementation, the IOP 140 is omitted, and the storage controller 104 can be connected to a computer bus, such as a PCI bus, for example.

In addition to fault tolerance provided to each flash memory device that allows the flash memory device to be accessed even though a storage controller or a storage network or a link in the link set 106, 108 (FIG. 1) fails, some embodiments can also provide data redundancy. Data redundancy is implemented with erasure coding that enables data recovery even if some portion of stored data becomes corrupted or lost (due to storage device failure, etc.). One erasure coding protocol is the RAID (redundant array of inexpensive disks) protocol. For example, RAID 1 can be implemented, where a RAID 1 configuration provides a mirrored set without parity, in which two groups of physical storage devices are provided where one of the groups of physical storage devices is used to mirror (replicate) data on the other group of physical storage devices. In the example of FIG. 1, the two groups of physical storage devices can include a first group of physical storage devices associated with flash board 110, and a second group of physical storage devices associated with flash board 112.

There are also other RAID levels, such as RAID 5 or RAID 6 (which are examples of other types of data redundancy protocols). A RAID 5 configuration provides a striped set with distributed parity, which includes at least three groups (up to five groups) of physical storage devices. RAID 5 is tolerant to failure of one of the groups of physical storage devices. A RAID 6 configuration provides a striped set with dual parity to provide fault tolerance in the presence of two of the groups of physical storage devices.

In alternative arrangements, instead of using two flash boards, just one flash board or more than two flash boards can be used, where each flash board is connected to the storage controllers 102 and 104. In such a configuration, the PCI expanders 136 and 142 in the storage controllers 102 and 104 can be omitted. As yet another alternative, instead of including multiple flash expander circuits on one flash board, it is noted that just one flash expander circuit can be provided on a flash board. Moreover, instead of using a flash expander circuit that is separate from a flash memory device, it is noted that a flash expander circuit associated with a flash memory device can be included in the flash memory device, such that the flash memory device has multiple computer-based bus interfaces to connect to multiple storage controllers.

Figure 2:
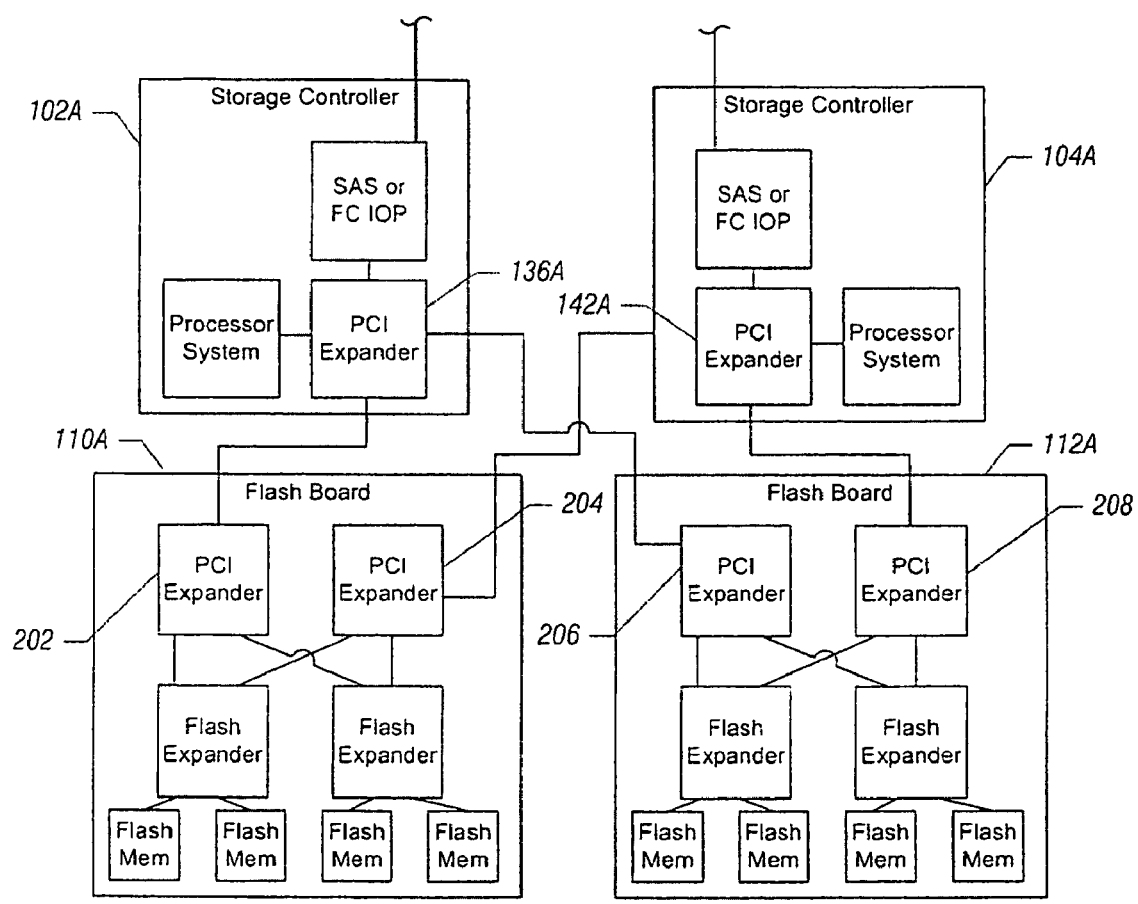

FIG. 2 illustrates a portion of a storage system according to another embodiment. In FIG. 2, PCI expanders 202 and 204 are provided on a flash board 110A and PCI expanders 206 and 208 are provided on flash board 112A. The PCI expander 202 and PCI expander 206 on flash boards 110A and 112A, respectively, are connected to the PCI expander 136A on storage controller 102A. Similarly, the PCI expander 204 and PCI expander 208 on flash boards 110A and 112A, respectively, are connected to PCI expander 142A in storage controller 104A. The PCI expander 136A or 142A differs from the respective PCI expander 136 or 142 (FIG. 1) in that the PCI expander 136 or 142 has four output interfaces (to connect to the four flash expander circuits 118, 128, 130, and 132 of FIG. 1), whereas the PCI expander 136A or 142A has just two output interfaces (to connect to two PCI expanders in respective flash boards 110A and 112A), thereby enabling much larger systems to be constructed with commodity expander circuits.

The remaining components depicted in FIG. 2 of the storage controllers 102A, 104A, and flash boards 110A, 112A are identical to corresponding components in FIG. 1, and thus share the same reference numerals.

Figure 3:
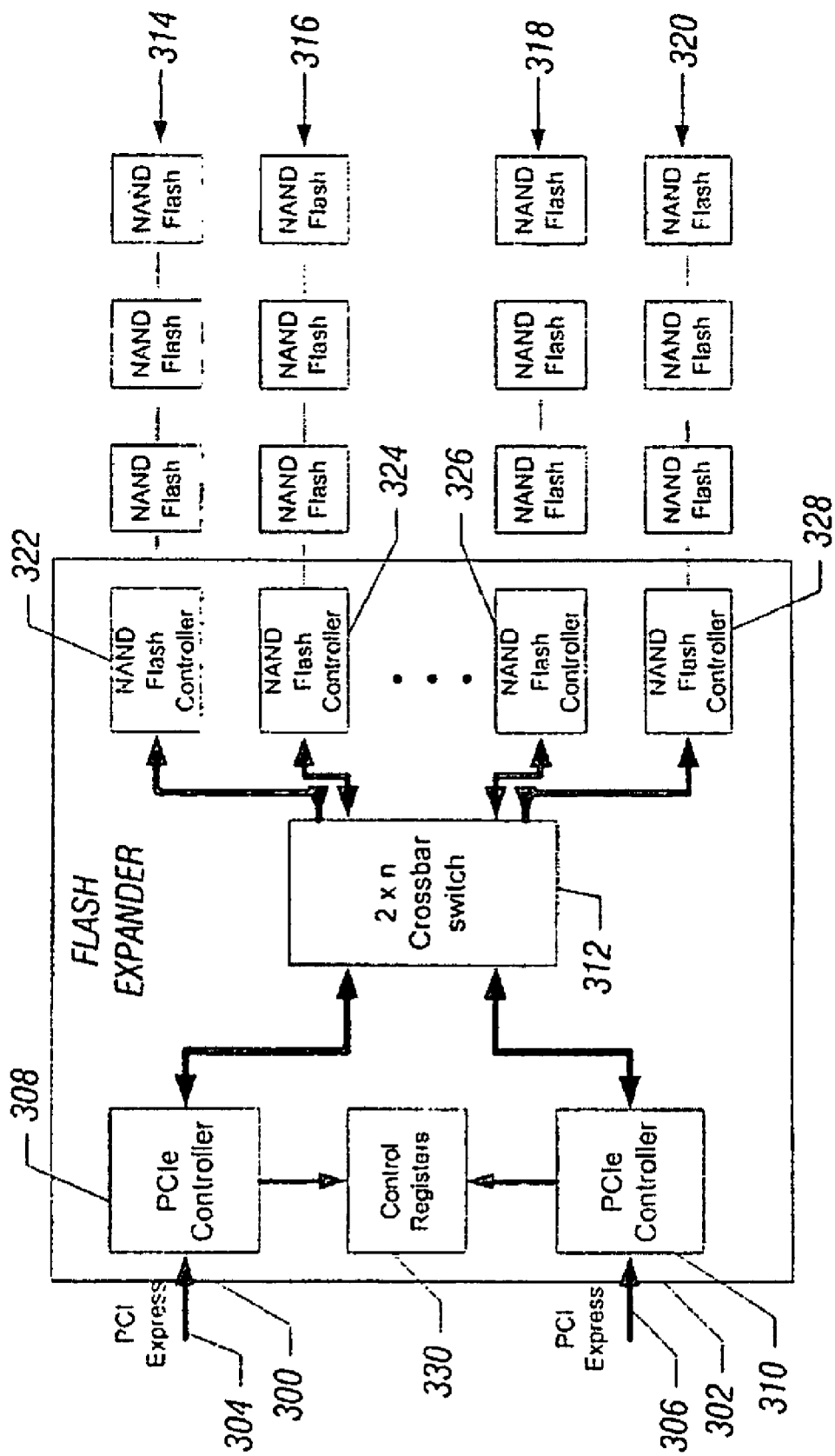
FIG. 3 is a block diagram of an expander circuit coupled to multiple solid state persistent storage devices, in accordance with an embodiment.

FIG. 3 shows the components within a flash expander circuit, such as flash expander circuit 118, 128, 130, or 132. The flash expander circuit of FIG. 3 includes a first interface 300 and second interface 302 that are connected to corresponding PCI Express buses 304 and 306 (or other types of computer-based buses), respectively. Within the flash expander circuit, PCIe (PCI Express) controllers 308 and 310 are provided to enable the flash expander circuit to communicate over the corresponding PCI Express buses 304 and 306.

The PCIe controllers 308 and 310 are in turn connected to a 2×n (n≧1) crossbar switch 312 that enables switching between the PCIe controllers 308 and 310 and n flash controllers 322, 324, 326, and 328. The n flash controllers 322, 324, 326, and 328 are connected to n sets of flash memory devices (e.g., NAND flash memory devices) 314, 316, 318, and 320. The flash controllers 322, 324, 326, 328 manage access of the respective sets of flash memory devices. The 2×n crossbar switch 312 allows requests received by a PCIe controller to be routed to one of the flash controllers depending on the target flash memory device. The 2×n crossbar switch 312 also enables data retrieved from a flash memory device to be routed back to a corresponding PCIe controller.

The flash expander circuit of FIG. 3 also includes control registers 330 that can be programmed with values to control which of the PCIe controllers is active for accessing the corresponding sets of NAND flash memory devices. For example, under normal operating conditions, the control registers 330 can be programmed with a first value so that the PCIe controller 308 is active while the PCIe controller 310 is inactive (standby or failed)—this provides an active-standby arrangement. If a failure of the storage controller (or associated storage network) connected to the PCIe controller 308 is detected, then the control registers 330 can be programmed with a different value to cause the PCIe controller 308 to become inactive and the PCIe controller 310 to become active.

Alternatively, both the PCEe controller 308 and PCIe controller 310 can be active (to provide an active-active arrangement).

In other implementations, the expander circuit can also include additional functionality related to flash technology management such as wear leveling.

Programming of the control registers 330 can be accomplished by any controller in the storage system, such as processor systems 138 and 142 in storage controllers 102, 102A and 104, 104A, for example. Alternatively, an administrator controller (not shown) can be provided that detects for failures of storage controllers or storage networks, where the administrator controller is used to program the control registers 330 of flash expander circuits.

Figure 4:
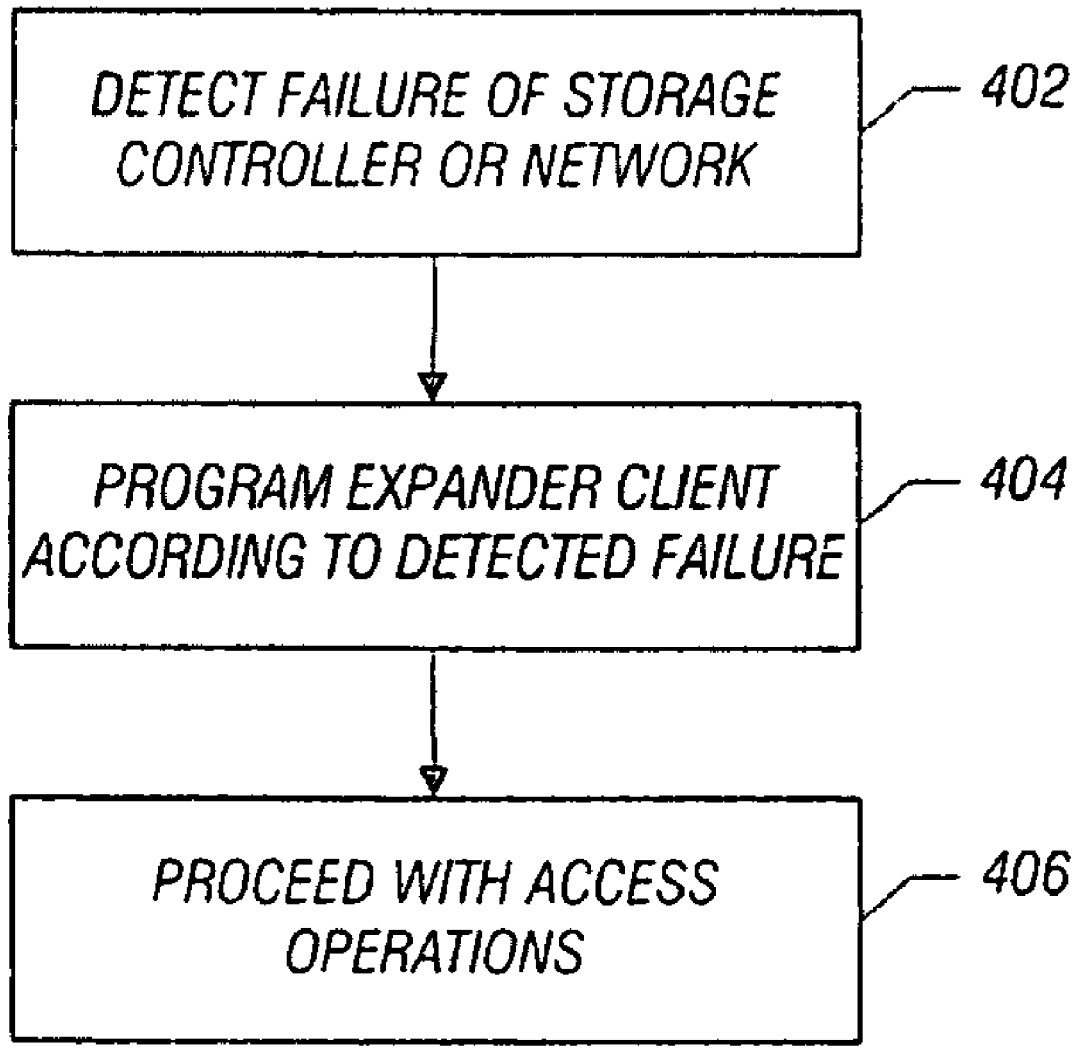
FIG. 4 is flow diagram of a process of providing fault tolerance in a storage system that has solid state persistent storage devices, according to an embodiment.

FIG. 4 illustrates a fault tolerant procedure that utilizes the fault tolerant arrangement depicted in FIGS. 1-3, in accordance with an embodiment. The procedure can be performed by any designated controller in the storage system. First, the procedure detects (at 402) failure of a storage controller or storage network or a link in the link sets 106, 108, (FIG. 1). The failure detection can be based on a storage controller no longer issuing heartbeat messages (when heartbeat messages are expected), for example. In one example, there can be an interconnection between the storage controllers 102 and 104 over which heartbeat messages can be sent periodically. If a first of the storage controllers does not receive a heartbeat message from the other storage controller, then that would indicate to the first storage controller that the other storage controller has failed. Also, the storage controllers 102 and 104 can also notify each other of storage network failures. Alternatively, some administrative controller can be connected to the storage controllers 102 and 104 to receive indications (e.g., heartbeat messages) of which storage controllers or storage networks has failed.

Upon detection of failure of a storage controller or a storage network or a link in the link sets 106, 108, the flash expander circuits can be programmed (at 404) (e.g., such as setting corresponding values in the control registers 330 depicted in FIG. 3) to cause the flash expander circuits to expect access commands to be received over the appropriate one of the computer-based bus interfaces of each flash expander circuit. The above procedure can be performed in either the active-standby or active-active context.

Once the control registers 330 are programmed, then the storage system can proceed (at 406) with storage device access operations.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An apparatus comprising:
a solid state persistent storage device;
a plurality of storage controllers to manage access of the solid state persistent storage device; and
an expander circuit connected to the solid state persistent storage device and having a plurality of interfaces connected to the corresponding plurality of storage controllers, wherein the plurality of interfaces are computer-based bus interfaces, wherein the expander circuit provides fault tolerance such that failure of one of the storage controllers does not prevent access of data in the solid state persistent storage device.

2. The apparatus of claim 1, further comprising:
a first storage board containing the expander circuit and the solid state persistent storage device; and
a second storage board containing a second expander circuit and a second solid state persistent storage device, the second expander circuit connected to the second solid state persistent storage device and having a plurality of computer-based bus interfaces connected to the corresponding plurality of storage controllers.

3. The apparatus of claim 1, wherein the computer-based bus interfaces comprise Peripheral Component Interconnect (PCI) bus interfaces.

4. The apparatus of claim 1, wherein the solid state persistent storage device comprises one of a flash memory device and a battery-based memory device.

5. The apparatus of claim 1, further comprising another solid state persistent storage device connected to the expander circuit.

6. The apparatus of claim 1, wherein the expander circuit is connected to a particular one of the storage controllers over a Peripheral Component Interconnect (PCI) bus.

7. The apparatus of claim 6, further comprising a PCI expander, wherein the expander circuit is connected to the particular storage controller through the PCI expander and over the PCI bus.

8. An apparatus comprising:
a solid state persistent storage device;
a plurality of storage controllers to manage access of the solid state persistent storage device;
an expander circuit connected to the solid state persistent storage device and having a plurality of interfaces connected to the corresponding plurality of storage controllers, wherein the plurality of interfaces are computer-based bus interfaces;
a first storage board containing the expander circuit and the solid state persistent storage device; and
a second storage board containing a second expander circuit and a second solid state persistent storage device, the second expander circuit connected to the second solid state persistent storage device and having a plurality of computer-based bus interfaces connected to the corresponding plurality of storage controllers,
wherein the first and second storage boards enable error recovery using erasure coding.

9. An apparatus comprising:
a solid state persistent storage device;
a plurality of storage controllers to manage access of the solid state persistent storage device;
an expander circuit connected to the solid state persistent storage device and having a plurality of interfaces connected to the corresponding plurality of storage controllers, wherein the plurality of interfaces are computer-based bus interfaces; and
a plurality of storage boards containing respective expander circuits and solid state persistent storage devices, wherein the plurality of storage boards enable provision of RAID (redundant array of inexpensive disks) redundancy.

10. A method of providing fault tolerance, comprising:
connecting a solid state persistent storage device to an expander circuit;
connecting computer-based bus interfaces of the expander circuit to corresponding ones of a plurality of storage controllers;
programming the expander circuit to communicate with a particular one of the plurality of storage controllers;
detecting failure of the particular storage controller or failure of a storage network connected to the particular storage controller or failure of a link between the particular storage controller and the expander circuit; and
in response to detecting the failure, re-programming the expander circuit to communicate with another one of the plurality of storage controllers.

11. A method of providing fault tolerance, comprising:
connecting a solid state persistent storage device to an expander circuit;
connecting computer-based bus interfaces of the expander circuit to corresponding ones of a plurality of storage controllers;
programming the expander circuit to communicate with a particular one of the plurality of storage controllers;
connecting at least another solid state persistent storage device to another expander circuit; and
performing data error recovery using erasure coding for data stored in the solid state persistent storage devices.

* * * * *